United States Patent [19]

Tosa et al.

[11] Patent Number: 5,170,751
[45] Date of Patent: Dec. 15, 1992

[54] WATER-INJECTION DIESEL ENGINE

[75] Inventors: Yozo Tosa; Yoshinori Nagae, both of Nagasaki, Japan

[73] Assignee: Mitsubishi Jukogyo Kabushiki Kaisha, Tokyo, Japan

[21] Appl. No.: 785,078

[22] Filed: Oct. 30, 1991

Related U.S. Application Data

[63] Continuation of Ser. No. 653,159, Feb. 11, 1991, abandoned.

[30] Foreign Application Priority Data

May 23, 1990 [JP] Japan ................................. 2-133574

[51] Int. Cl.$^5$ .......................................... F02M 43/04
[52] U.S. Cl. ................................. 123/25 C; 123/299
[58] Field of Search ................ 123/25 R, 25 A, 25 C, 123/25 J, 299, 305

[56] References Cited

U.S. PATENT DOCUMENTS

| | | | |
|---|---|---|---|
| 3,763,832 | 10/1973 | Fenne | 123/25 C |
| 3,921,599 | 11/1975 | Grow | 123/25 A |
| 3,933,132 | 1/1976 | Kishishita | 123/25 C |
| 4,699,103 | 10/1987 | Tsukahara et al. | 123/304 |
| 4,864,990 | 9/1989 | Tateishi et al. | 123/304 |

FOREIGN PATENT DOCUMENTS

0282819 9/1988 European Pat. Off. .

Primary Examiner—Andrew M. Dolinar
Attorney, Agent, or Firm—Wenderoth, Lind & Ponack

[57] ABSTRACT

An improved fuel/water injection device of a diesel engine injects both fuel and water into a combustion chamber of the engine from the same fuel injection valve in a manner which reduces both the black smoke and $NO_x$ in the exhaust gas. During each injection, 5% or more and 75% or less of the total amount of fuel is firstly injected; subsequently, a total amount of water is injected; and finally, the remaining fuel is injected.

4 Claims, 3 Drawing Sheets

WATER-INJECTION DIESEL ENGINE

This application is a continuation of now abandoned application Ser. No. 07/653,159 filed Feb. 11, 1991.

BACKGROUND OF THE INVENTION

1. Field of the Invention

The present invention relates to a water-injection diesel engine of the type in which both fuel and water are injected into a combustion chamber for the purpose of reducing black smoke and the $NO_x$ in exhaust gas and for improving the rate of fuel consumption.

2. Description of the Prior Art

Heretofore, it has been well known that in a diesel engine, when water is mixed with the fuel, when emulsion fuel is employed or when water is injected into a combustion chamber separately from the fuel, the nitrogen oxides ($NO_x$) in the exhaust gas of the diesel engine are reduced.

However, the above-described measures have shortcomings with respect to their being practical in that an additive is required for mixing the fuel with water or an additional injection device is necessary for injecting water into a combustion chamber.

Furthermore, in considering the performance of the engine, the addition of water to the fuel had not always been fully taken advantage of because as the amount of water was increased, the $NO_x$ reducing effect became insufficient, the amount of black smoke in the exhaust gas increased or the rate of fuel consumption became poor.

SUMMARY OF THE INVENTION

It is therefore one object of the present invention to resolve the above-mentioned problems of the fuel-injection diesel engine in the prior art.

A more specific object of the present invention is to provide a water-injection diesel engine having high reliability, which is compact and very practical, and which has a fuel system that does not differ largely from that in the prior art and that can easily stop injecting upon the start and stopping of the engine. According to the invention, nitrogen oxides ($NO_x$) contained in the exhaust gas of the diesel engine can be reduced, and moreover, black smoke in the engine exhaust gas and the rate of fuel consumption can also be reduced simultaneously.

In the water-injection diesel engine according to the present invention, both fuel and water are injected from a single fuel injection valve, and the novel injection system can appropriate part of the "Injection System of a Dual Fuel Engine" disclosed in Laid-Open Japanese Patent Specification No. 63-227951 (1988) (Japanese Patent Application No. 62-59816 (1987)).

According to one feature of the present invention, a method for injecting fuel and water into a combustion chamber of a diesel engine from a common fuel injection valve comprises: during one injection, firstly injecting 5% or more and 75% or less of the total amount of fuel, subsequently injecting a total amount of water, and finally injecting the remaining amount of fuel.

According to another feature of the method of the present invention, the water is injected from the fuel injection valve at a volume ratio of 10–80% of the total amount of fuel to be injected.

According to still another feature of the present invention, in a water-injection diesel engine, a fuel/water injection device is designed to inject both fuel and water into a combustion chamber of the engine from a common fuel injection valve. The fuel injection valve includes a fuel reservoir, an injection port communicable with the reservoir, a joining section where a fuel path and a water path defined in the valve join upstream of the fuel reservoir, and a check valve for allowing water to flow only towards the injection port. The water path defined in the fuel injection valve communicates with a control valve for opening and closing the injection valve to a source of water. The control valve is controlled by a control device such that the water is injected between fuel injections during one injection cycle.

According to yet another feature of the present invention, the volume of space in the reservoir when the fuel injection valve is closed and in the portion of the fuel path between the reservoir and joining section equals 5% or more and 75% or less of the total volume of fuel.

During the operation of the subject water-injection diesel engine, fuel is delivered to the fuel injection valve from a main fuel injection pump such that fuel and water already in the fuel injection valve are compressed. When the pressure of the fuel and water exceeds a predetermined pressure, the fuel valve is opened and injection is commenced.

During injection, at first 5% or more and 75% or less of the total amount of fuel to be injected is injected into the combustion chamber, and after an ignition lag time has elapsed, combustion is initiated. Successively fed water is injected towards the flame of the burning preceding fuel spray. At this time, since the water itself is a spray having air trapped therein, the air is fed to the burning fuel and combustion is enhanced.

Finally the remaining fuel is injected. In addition, at this time, as a result of the thermal influence of the water, the temperature rise of the flame is suppressed, whereby the generation of $NO_x$ is also suppressed.

In the above-described combustion process, the amount of precedingly injected fuel largely affects the combustion performance and the generation of $NO_x$. If the amount of preceding fuel is too small, it would be difficult to maintain combustion after ignition due to the thermal influence of the succeeding water injection, resulting in unstable or poor combustion. On the contrary, if the amount of preceding fuel is too large, a large amount of $NO_x$ would be generated due to the combustion of the preceding fuel, and so, the suppression of the generation of $NO_x$ by the water would be offset.

As a result of combustion tests of the engine making use of the fuel/water spray injection system according to the present invention, it has been discovered that to effectively suppress the generation of $NO_x$ and to simultaneously reduce both the amount of black smoke in engine exhaust gas as well as the rate of fuel consumption, 5% or less and 75% or more of the total amount of fuel should first be injected; subsequently, a total amount of water (at a volume ratio of 10% to 80% of the total amount of fuel) should be injected; and finally, the remaining fuel should be injected.

Furthermore, in the water-injection diesel engine having a fuel/water injection device according to the present invention, because the addition of water may be disadvantageous for the engine when the engine is started or stopped, a control device is provided by which the feed of water to the fuel injection valve can be stopped whereby the combustion chamber of the engine is supplied with fuel only.

BRIEF DESCRIPTION OF THE DRAWINGS

The above-mentioned and other objects, features and advantages of the present invention will become more apparent by referring to the following description of one preferred embodiment of the invention taken in conjunction with the accompanying drawings.

In the accompanying drawings.

DETAILED DESCRIPTION OF THE PREFERRED EMBODIMENT

Figure 1:
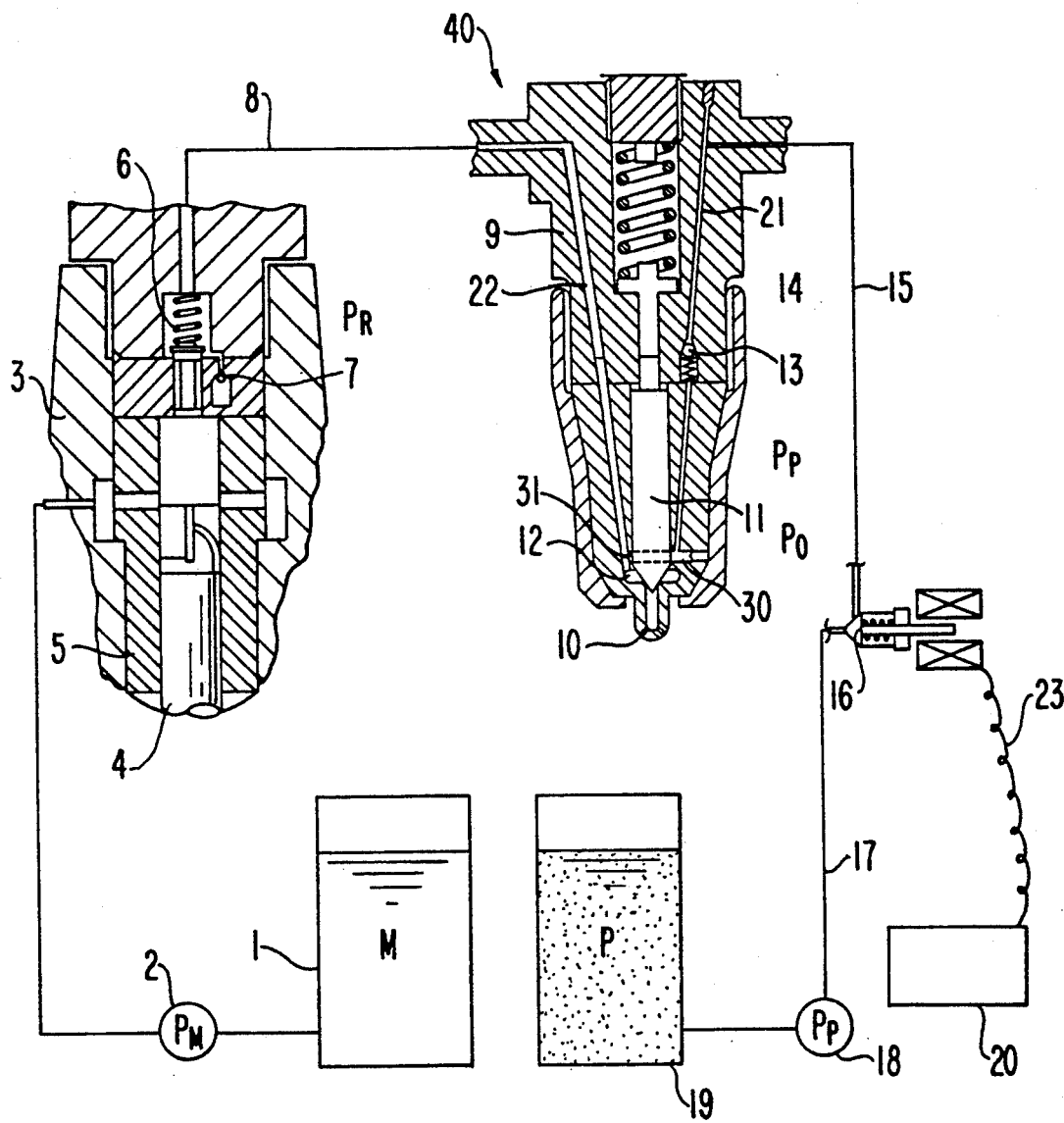
FIG. 1 is a cross-sectional view of a fuel/water injection device according to the present invention.

In the following, one preferred embodiment of the present invention will be described with reference to FIGS. 1 to 4. In these figures, reference numeral 1 designates a fuel tank, numeral 2 designates a fuel feed pump, numeral 3 designates a fuel injection pump main body, numeral 4 designates a plunger in the same fuel injection pump, numeral 5 designates a plunger barrel, numeral 6 designates a delivery valve, numeral 7 designates a pressure-regulating check valve provided in a bypass of the delivery valve 6, numeral 8 designates a fuel injection pipe, numeral 40 designates a fuel/water injection valve, numeral 9 designates a main body of the same fuel/water injection valve 40, numeral 10 designates an injection port, numeral 11 designates a needle valve, numeral 12 designates a fuel reservoir section, and numeral 14 designates a biasing spring for the needle valve 11.

On the other hand, numeral 19 designates a water tank, numeral 18 designates a water feed pump, numeral 17 designates a water feed pipe, numeral 16 designates a water feed control valve, numeral 15 designates a water feed pipe, and numeral 13 designates a check valve in a water feed path for preventing a reverse flow of water towards the control valve 16. In addition, numeral 20 designates a control device for controlling the amount and timing of the water fed to valve 40. A crank angle signal of the engine and other engine operation conditions are input to control device 20 and the device outputs a switching signal to the control valve 16 via a circuit 23.

In the main body 9 of the fuel/water injection valve 40 is drilled a fuel path 22, which places the fuel injection pipe 8 in communication with the fuel reservoir section 12 of the fuel/water injection valve 40. In addition, the check valve 13 in the water feed path is connected to a joining section 31, in turn intersecting the above-mentioned fuel path 22, via a water path 30 drilled likewise in the main body of the fuel/water injection valve 40.

Figure 2:
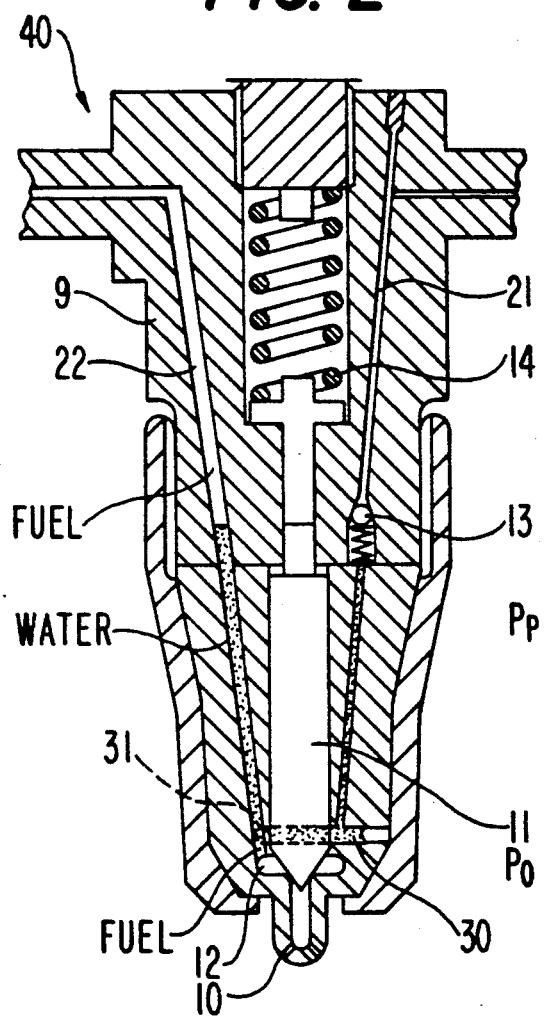
FIG. 2 is an enlarged cross-sectional view of a fuel/water injection valve of the device shown in FIG. 1.

With respect to the joining section 31, if the volume of the portion of the fuel path 22 extending from the joining section 31 to the fuel reservoir section 12 as seen in FIG. 2 is represented by $V_1$, while the volume of the fuel reservoir section 12 under the closed condition of the needle valve 11 is represented by $V_2$, and a total amount of fuel injected during one injection cycle is represented by $V_F$, the position of the joining section 31 is determined so as to satisfy the relation:

$$0.05 \leq \frac{V_1 + V_2}{V_F} \leq 0.75.$$

Furthermore, the pressures under which the pressure-regulating check valve 7, the check valve 13 and the needle valve 11 of the fuel injection valve, as represented respectively by $P_R$, $P_P$ and $P_O$, are established so as to satisfy the relations:

$$P_O > P_R, P_O > P_P.$$

Next, the operation of the above-described preferred embodiment will be described.

Water fed under pressure from the water tank 19 by means of the water feed pump 18 is sent through the feed pipe 17 to the control valve 16, and during a rest period of the fuel injection pump 3 when it is not feeding fuel under pressure, the aforementioned control valve 16 is kept in an open state for a predetermined period via the control device 20, and a predetermined amount of water is delivered to the fuel/water injection valve 40 via the water feed pipe 15. At this time, since the valve-opening pressure $P_R$ of the pressure-regulating check valve 7 of the fuel pump 3 and the valve-opening pressure $P_P$ of the check valve 13 in the water feed path satisfy the following relations with respect to the valve-opening pressure $P_O$ of the needle valve 11 as described previously:

$$P_O > P_R \ P_O > P_P,$$

the fed water flows through the check valve 13, the water path 30 and the joining section 31 into the fuel path 22.

The fuel existing on the upstream side of the joining section 31, that is, on the side of the fuel injection pump 3 within the fuel path 22, is pushed back through the fuel injection pipe 8 towards the fuel injection pump 3, forcibly opening the pressure-regulating check valve 7 and flowing reversely into a plunger.

Consequently, as shown in FIG. 2, the fuel/water injection valve 40 is filled with fuel having a volume $V_1 + V_2$ which is the sum of the volume $V_2$ of the fuel reservoir section 12 and the volume $V_1$ of the portion of the fuel path 22 extending from the joining section 31 to the fuel reservoir section 12. A second portion of the fuel path 22 on the upstream side of the aforementioned joining section 31 is filled with a predetermined amount of water, and further, a third portion of the fuel path 22 upstream of the second portion is filled with fuel.

Subsequently, when the plunger 4 of the fuel pump 3 rises and the compression of fuel is commenced, the pressure within the fuel injection pipe 8, the fuel path 22 and the fuel reservoir section 12 rises. When this pressure reaches the valve-opening pressure $P_O$ of the needle valve 11 or higher, the needle valve 11 is opened. At this time, owing to the action of the check valve 13, the water in the water path 30 cannot be pushed back towards the water tank 19.

Figure 3:
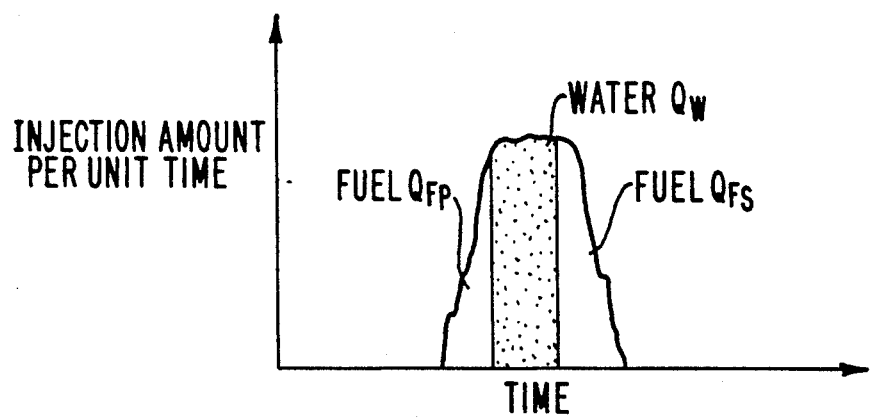
FIG. 3 is a diagram showing the change of injection rate with time.

When the pressure in the needle valve 11 has reached the valve-opening pressure $P_O$, as shown in FIG. 3, at first the fuel having a volume $V_1 + V_2$ occupying the fuel reservoir section 12 and the portion of the fuel path 22 between the joining section 31 and the fuel reservoir section 12 is injected through the injection port 10 of the fuel-water injection pump 40. Subsequently, a predetermined amount of fed water is injected, and finally the entire amount of the remaining fuel is injected. In other words, if the amount of fuel to be injected during one injection is $Q_F$, the amount of fuel first injected $Q_{FP}$ would be equal to $V_1 + V_2$ as described above. Subsequently, a total amount of water $Q_W$ is injected. And, the remaining fuel $Q_{FS} = Q_F - Q_{FP}$ is injected.

Figure 4A:
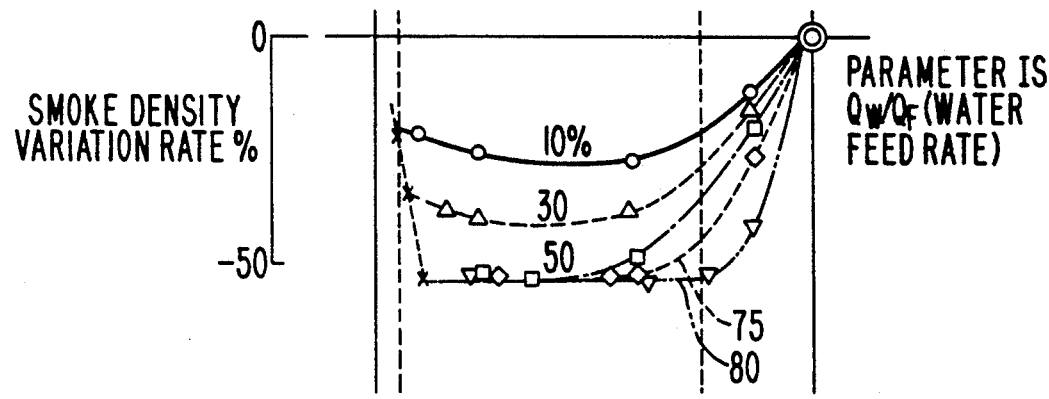
FIG. 4 is a diagram of performance curves of a water-injection diesel engine according to the present invention as functions of a rate of precedingly injected fuel.
Figure 4B:
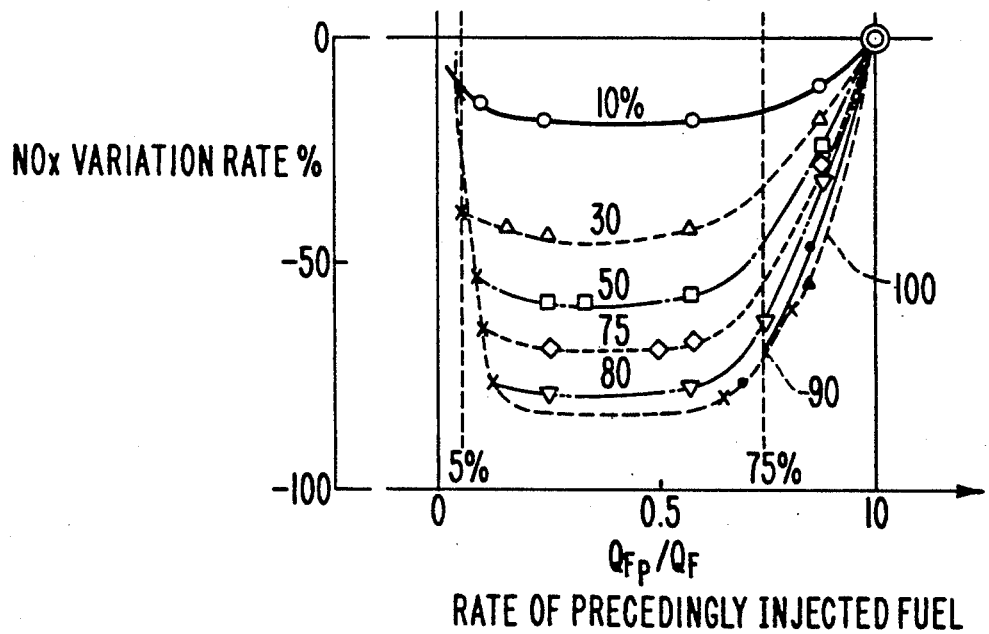

Tests were conducted by employing a diesel engine according to the illustrated embodiment, while varying the fuel injection amount $Q_{FP}$ and the water feed amount $Q_W$ by changing the position at which the above-described joining section 31 is connected to the fuel path 22. The test results are shown in FIGS. 4(a) and 4(b). Taking $Q_W/Q_F$ as a parameter, a precedingly injected fuel ratio $Q_{FP}/Q_F$ is plotted along the abscissa, and a variation rate of a smoke density or an $NO_x$ content is plotted along the ordinate.

With reference to these figures, it has been discovered that as the water feed rate $Q_W/Q_F$ is increased, the $NO_x$ content and smoke density of engine exhaust gas decreases. This effect is remarkable at a range of 5% or more and 75% or less of a precedingly injected fuel rate $Q_{FP}/Q_F$. In these figures, marks X indicate limit points in the value $Q_{FP}/Q_F$, below which a normal operation of the engine is difficult to achieve due to misfires or unstable combustion. Furthermore, if $Q_W/Q_F$ exceeds 80%, a normal operation can be attained only at a large value of $Q_{FP}/Q_F$ and also an amount of reduction of an $NO_x$ content is saturated. Therefore, the invention is effective when providing a value of $Q_W/Q_F$ within the range of 10% to 80%.

As will be obvious according to the present invention, owing to the facts that fuel and water are injected simultaneously into a combustion chamber of a diesel engine from the same fuel injection valve, a fuel path configuration and a water feed position in the fuel injection valve are designed in such a manner that during one injection, 5% or more and 75% or less of the total amount of fuel is firstly injected, subsequently a total amount of water at a volume ratio of 10% to 80% of the total amount of fuel is injected, and finally the remaining fuel is injected, the $NO_x$ and the density of black smoke in the exhaust gas of the diesel engine can be effectively reduced. And the expenses associated with fuel consumption can be reduced owing to the improvement in combustion obtained by carrying out the invention.

In addition, systems different from that of the illustrated embodiment can also provide the same advantage as long as they employ a common injection valve for both fuel and water, and are designed such that during one injection, firstly 5% or more and 75% or less of the total amount of fuel is injected, subsequently a total amount of water is injected, and finally the remaining fuel is injected.

Since the water-injection diesel engine according to the present invention has the above-described structure, the nitrogen oxides ($NO_x$) in the exhaust gas can be effectively reduced, and both the black smoke in the exhaust gas and the rate of fuel consumption can be simultaneously reduced.

While a principle of the present invention has been described above in connection with one preferred embodiment of the invention, it is intended that all matter contained in the above description and illustrated in the accompanying drawings be interpreted as illustrative of and not as limitation on the scope of the invention.

What is claimed is:

1. A method for injecting fuel and water into a combustion chamber of a diesel engine, said method comprising:

feeding fuel along a fuel passageway including both a fuel path defined within a fuel injection valve, and a reservoir communicating with said path and with a fuel injection port of the valve;

subsequently feeding water into said passageway at such a location that the water displaces all but 5% to 75% of the total volume of fuel, which is to be injected, in a direction away from the fuel injection port;

subsequently forcing the 5% to 75% of the total volume of fuel through the injection port;

subsequently forcing all of the water fed into said passageway through the injection port; and subsequently forcing the remaining amount of the total volume of fuel, which had been displaced by the water, through the injection port.

2. The method of injecting fuel and water into the combustion chamber of a diesel engine as claimed in claim 1, wherein the feeding of water into said passageway comprises feeding a volume of water which is 10% to 80% of the total volume of fuel to be injected.

3. In a diesel engine, a fuel/water injection device for injecting fuel and water into a combustion chamber of the engine, said device comprising:

a fuel injection valve defining a fuel injection port, a reservoir therein, a fuel path therein communicating with said reservoir, a water path therein, a joining path therein connecting said water path to said fuel path at a location upstream of said reservoir with respect to the direction of flow of fuel through the valve, and valve means for selectively opening and closing said reservoir to said fuel injection port;

water pump means for pumping water from a source thereof in the engine to said fuel injection valve;

a control valve connected between said fuel injection valve and said water pump means for selectively opening and closing the water path in said fuel injection valve to the source of water;

fuel injection pump means for cyclically feeding fuel to the fuel path defined in said fuel injection valve during each of successive fuel injection; and control means operatively connected to said control valve for controlling the opening and closing of said control valve under a timing which causes water to be supplied into said fuel path from said joining path between cycles in which the fuel is fed by said fuel injection pump means during a fuel injection such that the total amount of the supplied water is injected through said port after and before amounts of fuel are injected.

4. The fuel/water injection device in a diesel engine as claimed in claim 3, wherein the volume of space in said reservoir when closed by said valve means and in the portion of said fuel path between said reservoir and said joining path equals 5% to 75% of the total volume of fuel injected during one injection cycle by the device.

* * * * *